(12) United States Patent
Vadlakonda et al.

(10) Patent No.: US 8,411,598 B2
(45) Date of Patent: Apr. 2, 2013

(54) TELEPHONY USER INTERFACE TO SPECIFY SPATIAL AUDIO DIRECTION AND GAIN LEVELS

(75) Inventors: Sravan Vadlakonda, Sunnyvale, CA (US); Ashish Chotai, Santa Clara, CA (US); Shantanu Sarkar, San Jose, CA (US); Aseem Asthana, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1720 days.

(21) Appl. No.: 11/552,453

(22) Filed: Oct. 24, 2006

(65) Prior Publication Data

US 2008/0095077 A1    Apr. 24, 2008

(51) Int. Cl.
*H04L 12/16* (2006.01)
*H04Q 11/00* (2006.01)

(52) U.S. Cl. ........ 370/263; 370/260; 370/261; 370/262; 348/14.08; 348/14.09; 348/14.1; 379/202.01; 379/203.01; 379/204.01; 379/205.01; 379/206.01; 455/416; 709/217; 709/218; 709/219; 709/227; 709/228

(58) Field of Classification Search .................. None
See application file for complete search history.

(56) References Cited

U.S. PATENT DOCUMENTS

| | | | |
|---|---|---|---|
| 6,850,496 B1 | 2/2005 | Knappe et al. | |
| 7,577,247 B1* | 8/2009 | Sutardja | 379/374.01 |
| 2002/0156633 A1* | 10/2002 | Hickey et al. | 704/270 |
| 2004/0037434 A1* | 2/2004 | Balentine et al. | 381/82 |
| 2004/0052218 A1* | 3/2004 | Knappe | 370/260 |
| 2006/0133619 A1* | 6/2006 | Curry et al. | 381/26 |
| 2007/0121530 A1* | 5/2007 | Vadlakonda et al. | 370/260 |
| 2007/0156908 A1* | 7/2007 | Szomolanyi et al. | 709/227 |

* cited by examiner

*Primary Examiner* — Jae Y Lee
(74) *Attorney, Agent, or Firm* — P. Su (57) ABSTRACT

In one embodiment, a method comprises receiving through a telephony user interface from a user at the telephony user interface an indication of a first direction of a sound source along a first axis with respect to the user and a second direction of the sound source along a second axis with respect to the user. The first axis is substantially perpendicular to the second axis. The method further involves communicating the indication of the first direction and the second direction to enable audio communication of sound originating at the sound source to the user as if coming from the first direction and the second direction with respect to the user.

20 Claims, 6 Drawing Sheets

TELEPHONY USER INTERFACE TO SPECIFY SPATIAL AUDIO DIRECTION AND GAIN LEVELS

BACKGROUND OF THE INVENTION

The technical disclosure relates generally to voice conferencing. More particularly, the technical disclosure relates to allowing a spatial audio direction to be specified using a telephony user interface such that different directions may be perceived for voices associated with a conference call.

Voice over Internet Protocol (VoIP) utilizes a packet-switched network to transport voice data. Conventional telephones, such as those connected through a Public Switched Telephone Network (PSTN) or a Private Branch Exchange (PBX) to a packet voice gateway, may use VoIP as an intermediate transport medium. Internet Protocol (IP) telephones and software-implemented telephones are connected directly to a packet network may communicate using VoIP. IP telephones are often stereo capable. Hence, users of such IP telephones may experience stereo audio features in a voice stream, e.g., when the users use headsets with their IP telephones. This stereo capability may be further enhanced to provide spatial locations for the different audio sources. For example, a user may assign particular directions to different voice sources associated with a conference call such that he or she may effectively perceive each voice source as coming from a different direction. By assigning different directions to different voice sources, a user may more readily identify the voice sources. Graphical User Interfaces (GUIs) on computers are used by users to assign directions to voice sources associated with a conference call. Specifically, a computer display is used to enable a user to view and to select voice directions or spatial audio directions.

BRIEF DESCRIPTION OF THE DRAWINGS

The technical disclosure may best be understood by reference to the following description taken in conjunction with the accompanying drawings in which.

DESCRIPTION OF THE EXAMPLE EMBODIMENTS

General Overview

In one embodiment, a method comprises receiving through a telephony user interface from a user at the telephony user interface an indication of a first direction of a sound source along a first axis with respect to the user and a second direction of the sound source along a second axis with respect to the user. The first axis is substantially perpendicular to the second axis. The method further involves communicating the indication of the first direction and the second direction to enable audio communication of sound originating at the sound source to the user as if coming from the first direction and the second direction with respect to the user.

Internet Protocol (IP) phones with stereo capabilities may provide users of the IP phones with stereo audio features. IP phones with stereo capabilities include, but are not limited to, the Cisco IP Phone 7905 series, the Cisco IP Phone 7940 series, the Cisco IP Phone 7960 series, and the Cisco IP Phone 7985 series, which are each available commercially from Cisco Systems, Inc. of San Jose, Calif. In addition, soft clients such as Cisco IP Communicator and Cisco Unified Client, which are each also available from Cisco Systems, Inc., of San Jose, Calif., may provide stereo capabilities. Further, mobile clients on a cellular or WiFi phone may provide stereo and spatial capabilities.

When a voice in a conference is being received by a user with a stereo-capable phone, the user may specify the direction of the voice using a Telephony User Interface (TUI) of the phone such that the direction is signaled to a processing arrangement, e.g., a mixer associated with a conference server. In one embodiment, when the voice is clearly understood by the user, the user may enter a key sequence using a TUI that is a keypad to specify a two-dimensional or a three-dimensional spatial direction for the voice. The user may also use a key sequence to specify a perceived distance, e.g., a gain or an amplitude, associated with the voice in the key sequence.

Figure 1:
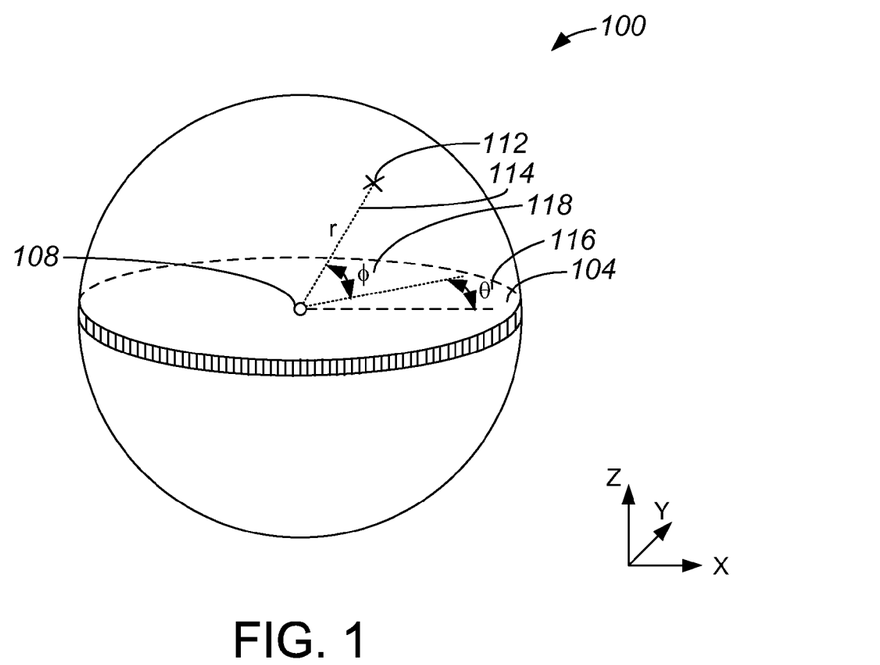
FIG. 1 is a representation of a three-dimensional frame of reference for a sound receiver that may perceive a spatial direction for a voice associated with a conference call in accordance with an embodiment of the present invention.

Referring initially to FIG. 1, a three-dimensional frame of reference will be described in accordance with an embodiment of the present invention. A sound receiver 108 may be considered to be located substantially at a center of a plane 104 that passes through a frame of reference 100. It should be appreciated that sound receiver 108 may be a user of a stereo-capable phone, a stereo-capable phone, or a system that includes a user and a stereo-capable phone. Plane 104 may be considered to be a base on which an angle θ 116 is measured. Angle θ 116 indicates an angle in an xy-plane from which sound receiver 108 perceives sound that is provided, or emitted, by a sound source 112. An angle φ 118 indicates an angle in an xz-plane from which sound receiver 108 perceives sound to be received from. A distance 'r' 114 is a distance from which sound receiver 108 perceives sound to be received from.

Figure 2:
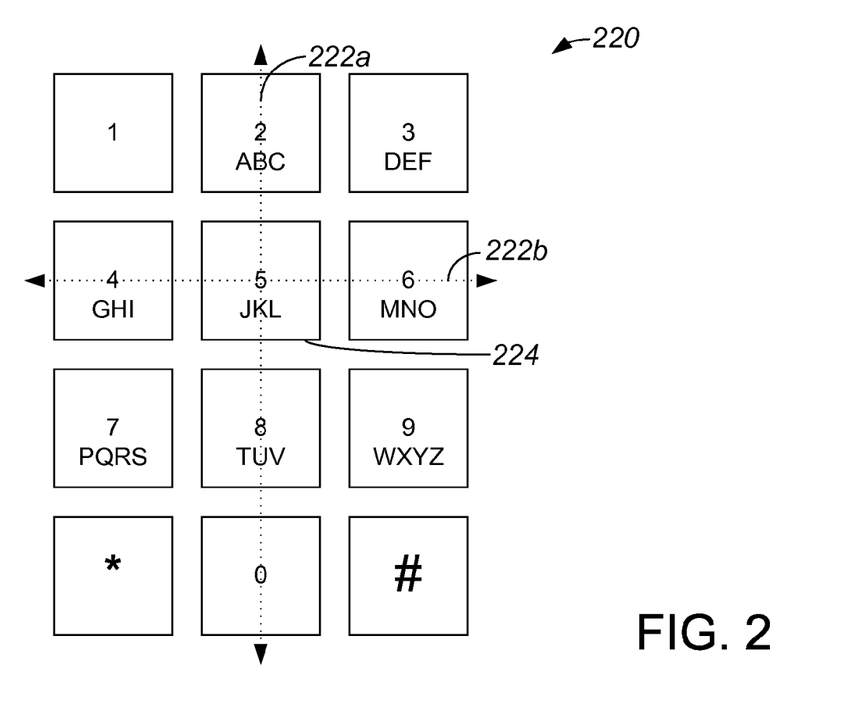
FIG. 2 is a diagrammatic representation of a keypad.

To specify angle θ 116, angle φ 118, and distance 'r' 114, sound receiver 108 may enter information using a TUI. The TUI may be a keypad, e.g., a numeric keypad of a stereo-capable phone through which sound provided by sound source 112 is received. FIG. 2 is a diagrammatic representation of a TUI which is a keypad that may be used to enter or otherwise specify spatial audio information and gain information in accordance with an embodiment of the present invention. A keypad 220, which may be located on a console of a stereo-capable phone (not shown) or on a handset of the stereo-capable phone, includes numerical keys. An x-axis 222a and a y-axis 222b may be defined such that the numerical keys are associated with directions, as will be described below with reference to FIGS. 3A and 3B. A '5' key 224 is effectively a center of a frame of reference associated with keypad 220, as x-axis 222a and y-axis 222b intersect at '5' key 224.

Figure 3A:
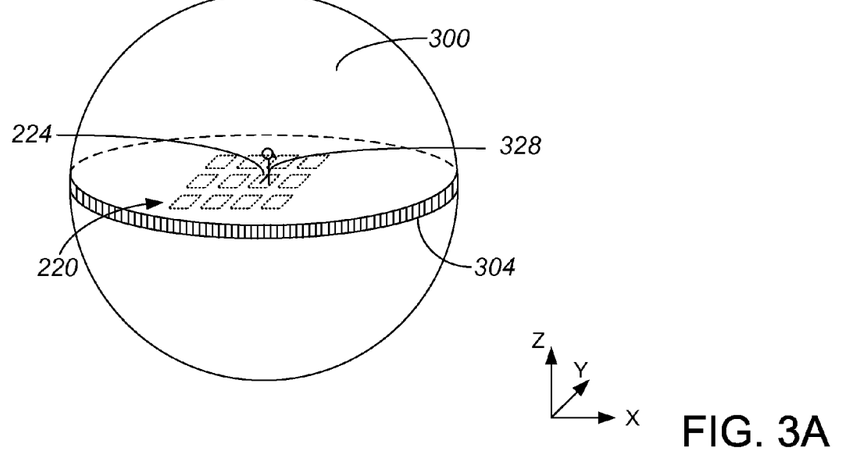
FIG. 3A is a diagrammatic three-dimensional representation of a sound receiver with a frame of reference relative to a keypad in accordance with an embodiment of the present invention.
Figure 3B:
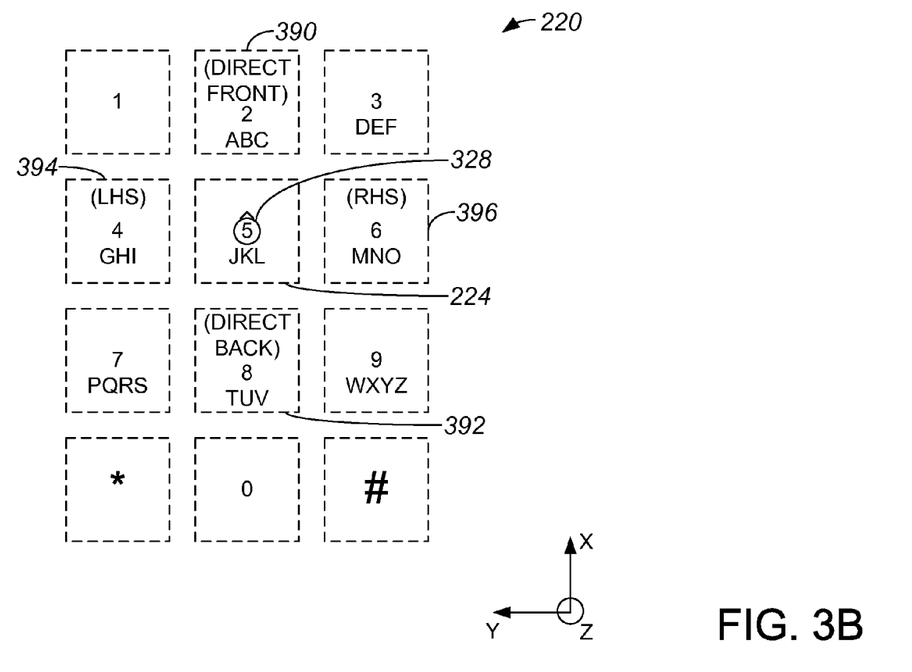
FIG. 3B is a diagrammatic two-dimensional representation of a sound receiver, e.g., sound receiver 328 of FIG. 3A, with a frame of reference relative to a keypad, e.g., keypad 220 of FIG. 3A, in accordance with an embodiment of the present invention.

A keypad such as keypad 220 may effectively be used, e.g., by a sound receiver, to specify dimensional vectors that allow directions to be specified. In other words, a sound receiver may use a keypad to provide an indication of directions, as for example to a conference server, from which the sound receiver wishes to perceive sound as being received from. Such a keypad may considered to be oriented parallel to a ground surface, although it should be appreciated that the keypad is not necessarily physically parallel to a ground surface. As shown in FIG. 3A, a sound receiver 328 is perceived to be located on '5' key 224 of keypad 220. Keypad 220 is effectively located on a plane 304 within a three-dimensional frame of reference 300. Plane 304 is substantially parallel to a ground surface, e.g., plane 304 is a xy-plane. FIG. 3B is a diagrammatic two-dimensional representation of sound receiver 328 being considered as having a frame of reference centered on '5' key 224. If sound receiver 328 is considered as being virtually situated on '5' key 224, selecting a '2' key 390 indicates that a voice or sound from a speaker is arranged to originate substantially directly in front of sound receiver 328, e.g., that '2' key 390 corresponds to angle θ 116 of FIG. 1 being approximately zero degrees. Further, selecting an '8' key 392 indicates that a voice or sound from a speaker is arranged to originate substantially directly in back of sound receiver 328, e.g., that '2' key 390 corresponds to angle θ 116 of FIG. 1 being approximately 180 degrees. Other numerical keys may be selected to indicate other directions. By way of example, a '4' key 394 may be selected to indicate that a voice originates on a left hand side of sound receiver 328 and a '6' key 396 may be selected to indicate that a voice originates on a right hand side of sound receiver 328. Selecting '5' key 224 may specify no direction, e.g., the selection of '5' key 224 may effectively be a non-operation Alternatively, selecting '5' key 224 may provide scrolling functionalities that enable a direction to be indicated. For instance, repeatedly selecting '5' key 225 may cause the direction from which a voice is perceived as being received to change.

In the described embodiment, a keypad convention is such that if '2' key 390 is used to signify a first direction from which a voice originates, then '8' key 392 is used to signify a second direction from which a voice originates that is approximately 180 degrees off from the first direction. Similarly, a direction specified by '4' key 394 is approximately 180 degrees off from a direction specified by '6' key 396. Typically, the direction specified by '4' key 394 is also approximately ninety degrees from the direction specified by '2' key 390 and approximately ninety degrees from the direction specified by '8' key 392. Hence, if a sound receiver selects '8' key 392, the sound receiver is effectively indicating that he, she, or it wishes to perceive sound as coming substantially directly from behind him, her, or it, respectively.

A sound receiver, or a user of TUI associated with a telephone apparatus, may indicate that a spatial direction is to be specified by either uttering a "hot word" or entering a particular key sequence, e.g., a key sequence that is preset in a keypad convention to indicate that the user intends to specify the direction of a voice that is currently heard. The hot word or key sequence may be received by a conference server, which then provides an indication to the user that the direction of the voice may be specified. Such an indication may be a recorded message or a "beep." The user may either specify a direction from which the voice is to originate, or may specify both the direction and an angle from which the voice is to originate.

Figure 4A:
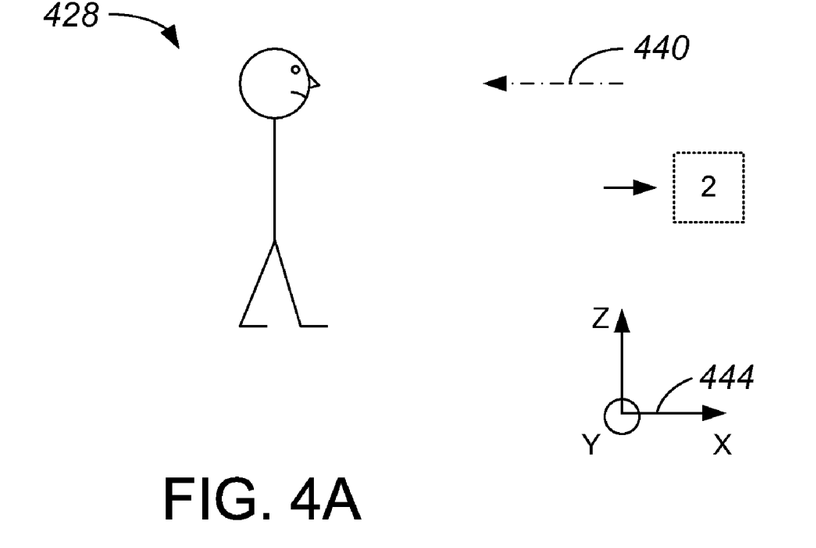
FIG. 4A is a diagrammatic representation of a sound receiver with an incoming voice direction perceived as coming from directly in front of the sound receiver while parallel to an x-axis in accordance with an embodiment of the present invention.

With reference to FIG. 4A, the use of a keypad convention to specify a voice as originating from a particular direction will be described in accordance with an embodiment of the present invention. A sound receiver 428 may specify that a voice source (not shown) is to provide a voice signal 440 that originates substantially directly in front of sound receiver 428, and parallel to an X-axis 444. In one embodiment, such a specification may occur by pressing a '2' key of a keypad (not shown) after a conference server provides an indication that a spatial audio direction may be specified. When voice signal 440 originates substantially directly in front of sound receiver 428, voice signal 440 is effectively perceived as being provided in an xy-plane.

Figure 4B:
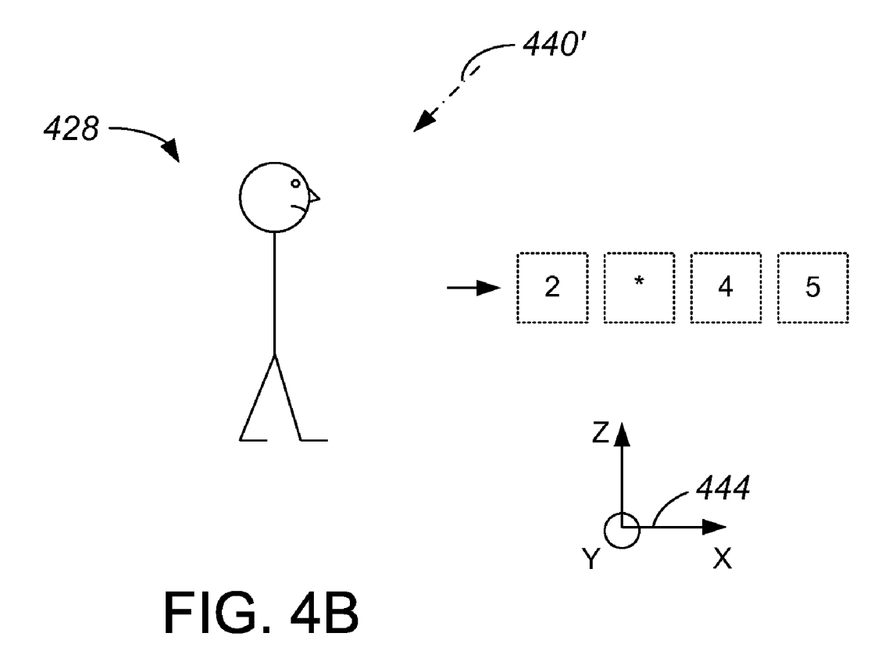
FIG. 4B is a diagrammatic representation of a sound receiver, e.g., sound receiver 428 of FIG. 4A, with an incoming voice direction perceived as coming from in front of the sound receiver at a forty-five degree angle relative to an x-axis in accordance with an embodiment of the present invention.

When voice signal 440 is specified as originating parallel to X-axis 444 and substantially directly in front of sound receiver 428, a two-dimensional spatial audio direction is effectively specified. To specify a three-dimensional spatial audio direction, sound receiver 428 may specify a direction relative to an xy-plane as well as an angle relative to X-axis 444. That is, with reference to FIG. 1, sound receiver 428 may basically specify angle θ 116 using a direction indication, and angle φ 118. The angle relative to X-axis 444 may typically be any angle between approximately zero degrees and approximately 360 degrees. FIG. 4B is a diagrammatic representation of sound receiver 428 receiving a voice signal from a spatial audio direction that is specified in three dimensions in accordance with an embodiment of the present invention. Sound receiver 428 may specify that a voice signal 440' originates at approximately 45 degrees to X-axis 444 towards a front of sound receiver 428. In one embodiment, entering a '2' key of a keypad (not shown), followed by a '*' key, a '4' key, and a '5' key, specifies that voice signal 440" is to originate from in front of sound receiver 428 at an angle of approximately 45 degrees.

Figure 4C:
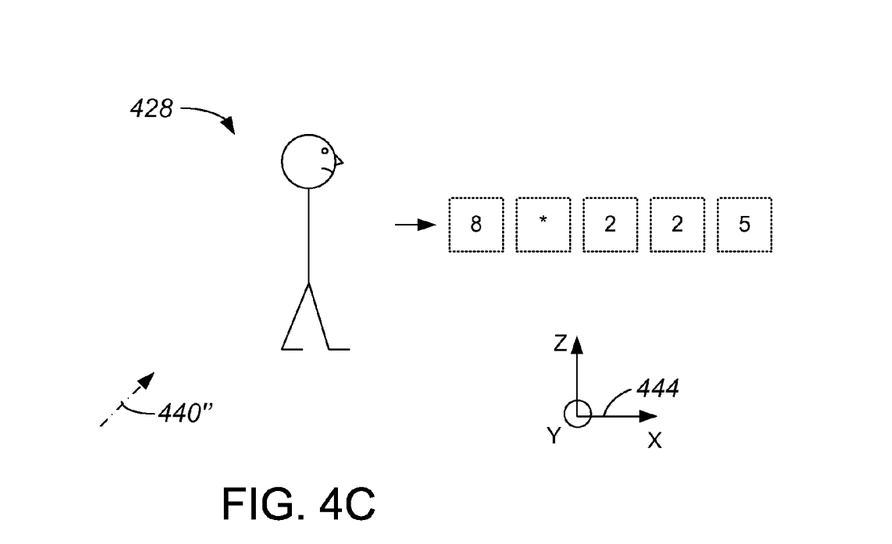
FIG. 4C is a diagrammatic representation of a sound receiver, e.g., sound receiver 428 of FIG. 4A, with an incoming voice direction perceived as coming from in back of the sound receiver at a two-hundred-twenty-five degree angle relative to an x-axis in accordance with an embodiment of the present invention.

Voice signals may originate from substantially any direction and angle. FIG. 4C is a diagrammatic representation of sound receiver 428 receiving a voice signal from a spatial audio direction that is behind and below sound receiver 428 in accordance with an embodiment of the present invention. Sound receiver 428 may specify that a voice signal 440" originates at approximately 225 degrees to X-axis 444 towards a back of sound receiver 428. In the embodiment as shown, entering a '8' key of a keypad (not shown), followed by a '*' key, a '2' key, a '2' key, and a '5' key, specifies that voice signal 440" originates from substantially directly in back of sound receiver 428 at an angle of approximately 225 degrees, or negative 135 degrees relative to X-axis 444.

Figure 5:
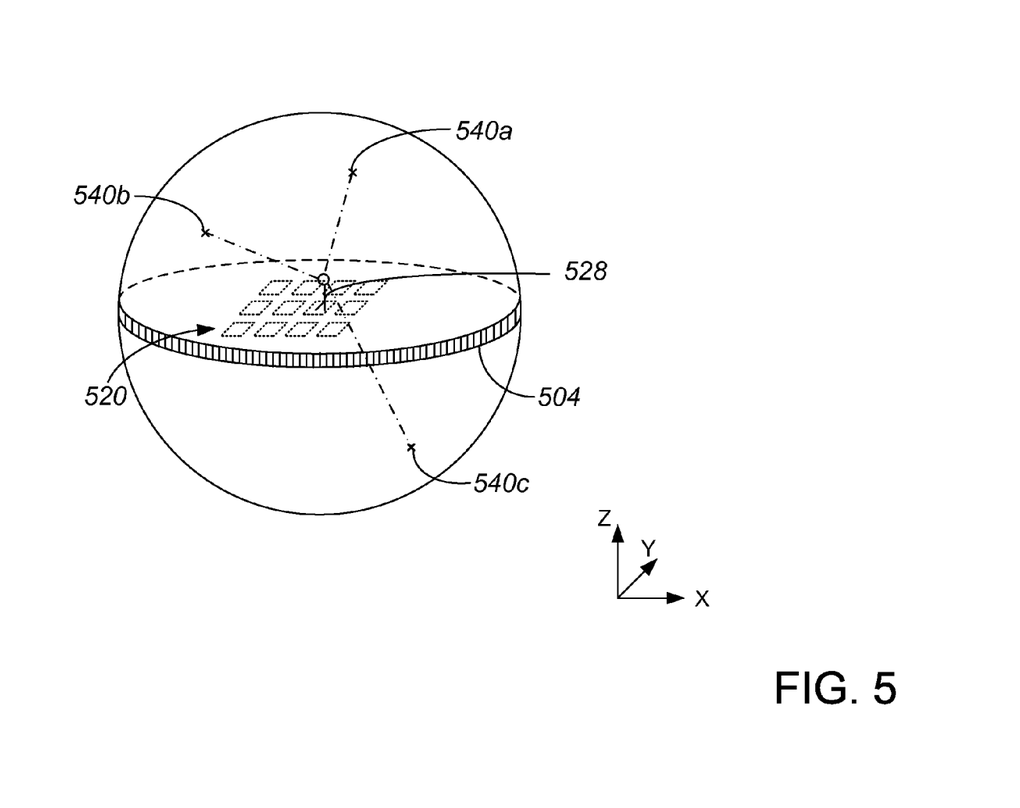
FIG. 5 is a diagrammatic three-dimensional representation of a sound receiver with multiple perceived voice directions in accordance with an embodiment of the present invention.

Typically, conference calls include more than one voice source. A conference server may manage a conference call in which there are multiple call-in sites. It should be appreciated that any particular sound receiver or participant may assign different spatial audio directions to each call-in site or voice source. FIG. 5 is a diagrammatic three-dimensional representation of a sound receiver that perceives different voice directions for different voice sources in accordance with an embodiment of the present invention. A sound receiver 528, which is associated with a keypad 520 that is on a surface 504 that is horizontal, may perceive voice sources 540*a-c* as coming from different directions. As previously mentioned, sound receiver 528 is perceived as being in an approximate middle of keypad 520. If distances are specified in addition to directions, sound receiver 528 may also perceive voice sources 540*a-c* as coming from different distances, e.g., having different gains or amplitudes.

Figure 6:
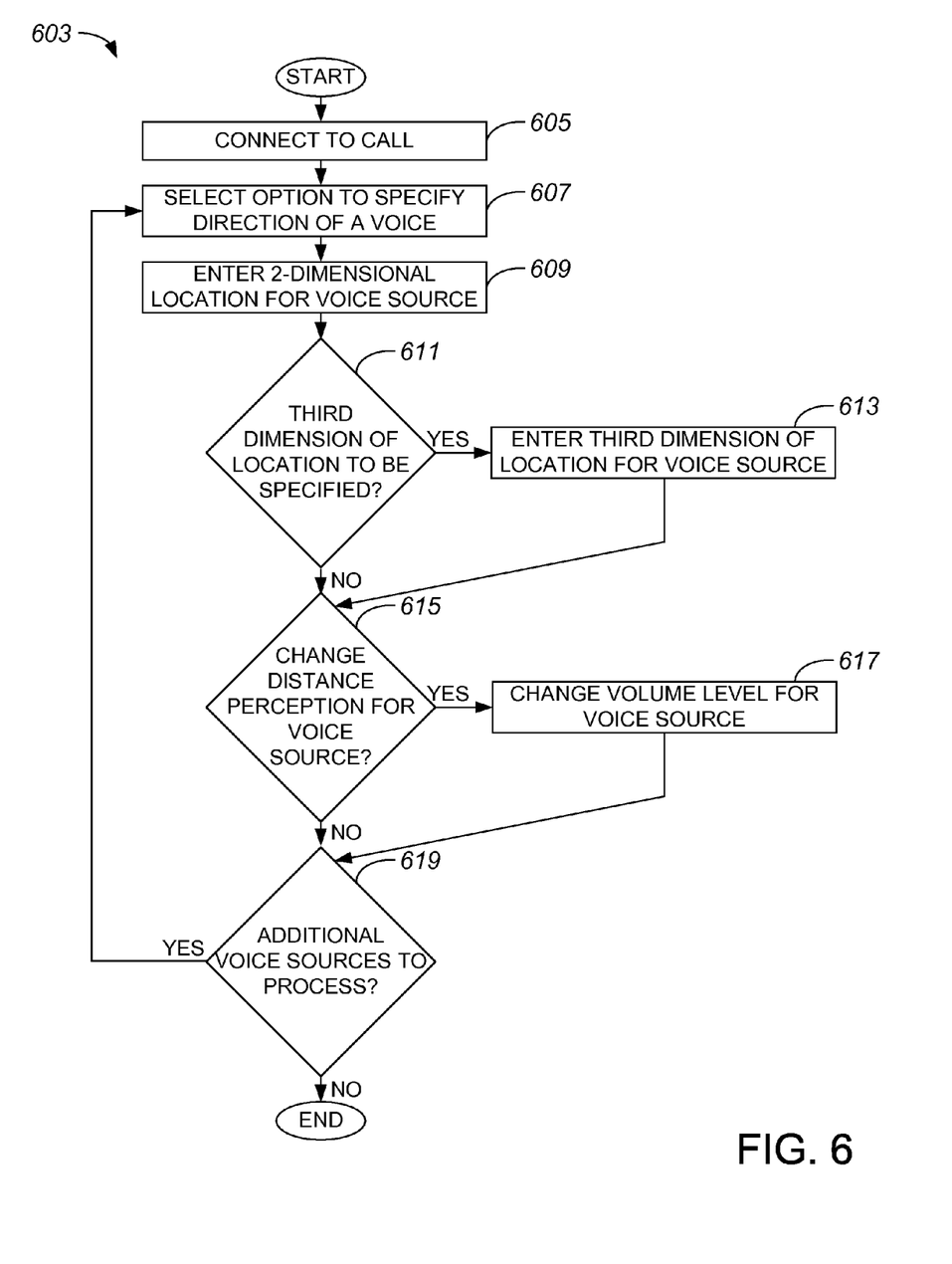
FIG. 6 is a process flow diagram which illustrates one method of specifying a spatial audio direction in accordance with an embodiment of the present invention.

The steps associated with specifying spatial audio directions may vary widely. FIG. 6 is a process flow diagram which illustrates one method of specifying a spatial audio direction for a voice associated with a call in accordance with an embodiment of the present invention. A process 603 of specifying a spatial audio direction begins at step 605 in which a sound receiver or a user connects to a call. In one embodiment, the call is a conference call and the sound receiver connects to the conference call via a conference server or a conference bridge. It should be appreciated, however, that the sound receiver may participate in a conference call that does not involve a conference server. For example, the endpoints of a call may send audio packets directly to one another, and mixing or super-positioning may occur at one or both of the endpoints.

After the sound receiver connects to a call, the sound receiver selects an option in step 607 that enables a voice direction to be specified. Selecting an option that enables a voice direction to be specified may include speaking a hot word, or entering a particular sequence of key strokes. As previously mentioned, the sound receiver may select an option that enables a voice direction to be specified upon hearing a particular voice. In other words, when a voice from a source is currently heard, the sound receiver may elect to assign a spatial audio direction to that voice by first indicating that the spatial audio direction is to be assigned.

Once the option to specify a voice direction is selected, a 2-dimensional location for the source of the voice is entered in step 609. That is, a location relative to a xy-plane is specified. The sound receiver may interface with a TUI to specify a planar direction from which the voice is to be perceived as originating. A determination is then made in step 611 regarding whether a third dimension, e.g., an angle, for the location is to be specified. If it is determined that a third dimension for the location is not to be specified, it is determined in step 615, as for example by the sound receiver, whether a distance perception for the voice source is to be changed. In other words, it is determined in step 615 whether the volume or gain level associated with the voice source is to be changed, e.g., changed from a default volume or gain level associated with the call. Changing a volume or a gain level may involve adjusting a volume control on a phone console. Such an adjustment may be made by a sound receiver, or by a proxy acting on behalf of the sound receiver. It is also possible that changing depth perception may include modifying factors in addition to the gain, e.g., the latency between the sound signals for two headphones may be modified.

If it is determined that no change in distance perception for the voice source is desired, process flow proceeds to step 619 in which it is determined if there are additional voice sources to process. Determining if there are additional voice sources to process may include a sound receiver determining if there is an additional voice source to which a direction is to be assigned, and determining if alterations are to be made to the direction of the voice source for which a direction has been assigned. If the determination is that there are additional voice sources to process, process flow returns to step 607 in which an option to specify a direction of a voice is selected. Alternatively, if it is determined that there are no additional voice sources to process, the process of specifying a spatial audio direction is completed.

Returning to step 615, if the determination is that the distance perception for the voice source is to be changed, then the volume level for the voice source is changed in step 617, e.g., by a sound receiver. After the volume level is changed, process flow moves to step 619 and the determination of whether there are additional voice sources to process.

Referring back to step 611, if it is determined that a third dimension of a location for the voice source is to be specified, the third dimension of the location is entered in step 613. Entering the third dimension may include a sound receiver interacting with a TUI to specify an angle relative to a horizontal axis from which the voice produced by the voice source is to originate. Once the third dimension is entered, process flow proceeds to step 615 in which it is determined if the distance perception for the voice source is to be changed.

Figure 7:
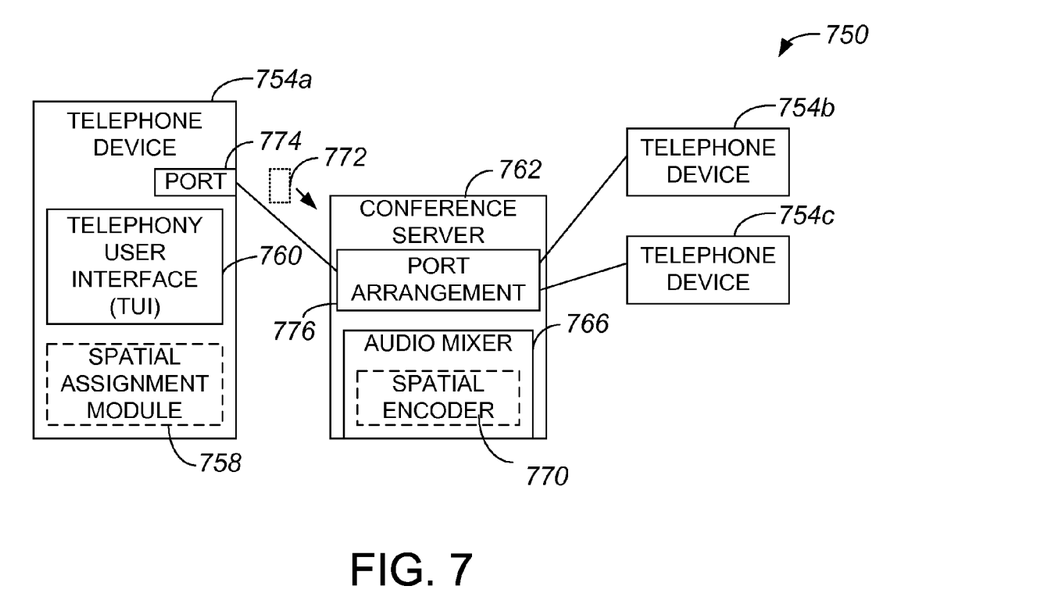
FIG. 7 is a block diagram representation of a system in which a spatial audio direction may be specified using a telephony user interface in accordance with an embodiment of the present invention.

The functionality associated with enabling a TUI to be used to specify a spatial audio direction for voice sources on a conference call may be implemented either in a telephone device, e.g., an IP phone, or in an audio mixer of a conference server. FIG. 7 is a block diagram representation of a system in which a spatial audio direction may be specified using a TUI in accordance with an embodiment of the present invention. A system 750 includes a plurality of telephone devices 754*a-c* or apparatuses which are arranged to be conferenced together by a conference server 762 or unit. Telephone devices 754*a-c* communicate with conference server 762 through a port arrangement 776. Telephone device 754*a*, which may be associated with a user who assigns spatial audio directions, is stereo-capable and includes a spatial assignment module 758. A port 774 or an interface is arranged to enable telephone device 754*a* to communicate with telephone devices 754*b*, 754*c* via conference server 762. For example, sound may be received by port 774 as packets from telephone devices 754*b*, 754*c*.

Spatial assignment module 758 is arranged to allow telephone device 754*a* to assign spatial audio directions to telephone devices 754*b*, 754*c* via a TUI interface 760. TUI interface 760 may be, but is not limited to being, a keypad interface or a voice recognition interface. In one embodiment, spatial assignment module 758 receives inputs entered by a user into telephone device 754*a* via TUI interface 760, and relates the inputs to a current active speaker, e.g., a speaker associated with either telephone device 754*b* or telephone device 754*c*. Relating the inputs to a current active speaker may include identifying a contributing source by reading a real-time transport protocol (RTP) or a real-time transport control protocol (RTCP) packet received or otherwise obtained from the current active speaker. The inputs may include a spatial direction, an angle, and/or a distance.

Spatial assignment module 758 may be implemented as logic that is stored in telephone device 754*a*. The logic may generally be encoded in a tangible medium such that the logic may be executed. The tangible medium may be, but is not limited to being, a memory associated with telephone device 754a, an application specific integrated circuit (ASIC) of telephone device 754a, a storage device that may be interfaced with telephone device 754a, or a carrier wave. In one embodiment, the logic may be code devices such as software code devices.

Conference server 762 includes an audio mixer 766 that has a spatial encoder 770 for performing spatial assignments. TUI information 772 that includes spatial audio direction information, may be transmitted from TUI interface 760 in telephone device 754a to audio mixer 766 substantially in band, e.g., as a RTP Named Telephony Event (NTE). Alternatively, TUI information 772 may be sent using Session Initiation Protocol (SIP) information with or without Keypad Markup Language (KPML) to audio mixer 766. TUI information 772 may also be sent as a Dual-Tone Multi-Frequency (DTMF) digit that may be used by spatial encoder 770 to set up spatial encoding.

Although system 750 includes telephone device 754a with spatial assignment module 758, and conference server 762 includes audio mixer 766 with spatial encoder 770, it should be appreciated that telephone device 754a may not necessarily include spatial assignment module 758 if audio mixer 766 includes spatial encoder 770. Alternatively, if telephone device 754a includes spatial assignment module 758, audio mixer 766 may not necessarily include spatial encoder 770. In one embodiment, when telephone device 754a includes spatial assignment module 758, telephone device 754a may include functionality to be conferenced with telephone device 754b and telephone device 754c substantially directly.

Figure 8:
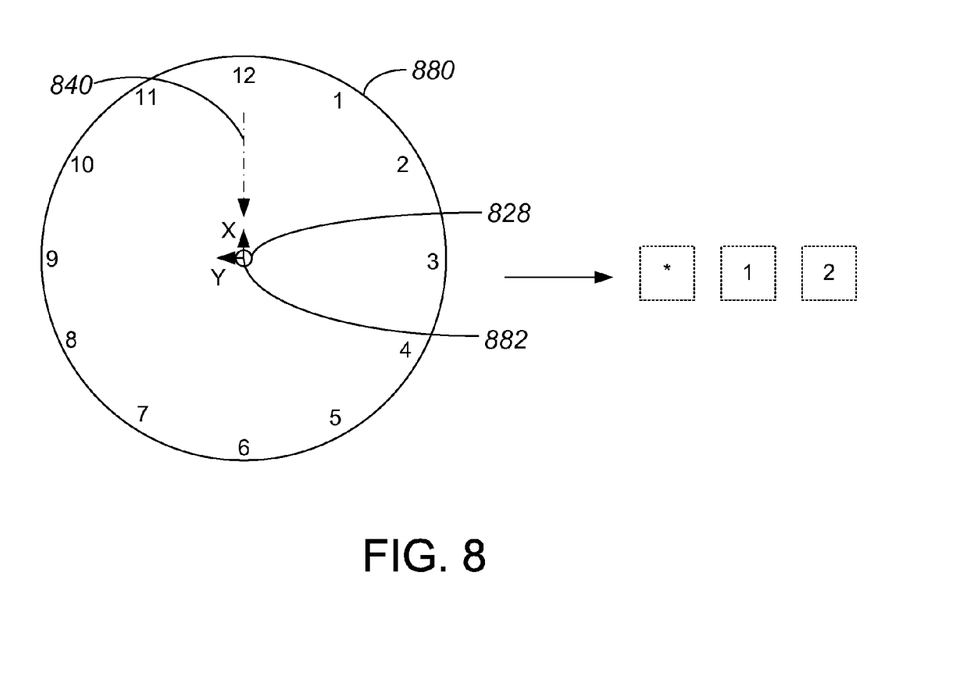
FIG. 8 is a diagrammatic representation of a frame of reference associated with an analog clock face in accordance with an embodiment of the present invention.

A keypad convention in which a sound receiver is considered to have a frame of reference centered on a '5' key, as previously discussed, may be used to specify a two-dimensional voice direction. However, a keypad convention is just one example of a suitable convention for use in specifying spatial audio directions. Another example of a convention is one that is based on an analog clock face representation. FIG. 8 is a diagrammatic representation of a frame of reference associated with an analog clock face in accordance with an embodiment of the present invention. A sound receiver 828 may be associated with a frame of reference 882 that is centered at a center of a clock face representation 880. Frame of reference 882 is such that sound direction 840 may be specified as coming directly towards a front of sound receiver 828 by effectively entering '12 o'clock' into a TUI. When the TUI is a keypad, selecting a '1' key followed by a '2' key specifies sound direction 840.

Sound directions associated with frame of reference 882 are consistent with clock face representation 880. By way of example, effectively entering '9 o'clock' into a TUI may cause receiver 828 is to perceive a sound as coming from the direct left, and effectively entering '3 o'clock' may cause receiver 828 to perceive a sound as coming from the direct right.

Although only a few embodiments of the present invention have been described, it should be understood that the present invention may be embodied in many other specific forms without departing from the spirit or the scope of the present invention. By way of example, a source of a sound that is perceived by a sound receiver has been described as being a voice source. The sounds that are perceived by a sound receiver, however, are not limited to being voices. The sounds that are perceived by a user may be substantially any sound. In addition to voices, sounds may include, but are not limited to, music from a music source.

In one embodiment, a distance assignment may be made to a voice source if the distance is assigned within a specified interval after a direction is assigned to a particular voice. That is, at substantially the same time that a direction is being set in response to a spatial audio direction assignment, a gain or amplitude level may be set. Alternatively, a distance assignment may be made independently of a spatial audio direction assignment. For example, if a voice is heard and a sound receiver wishes to alter the perceived distance associated with the voice, the sound receiver may change the distance by specifying a particular key sequence, and then adjusting a volume control on a phone.

The layout of a keypad such as a numeric keypad may vary widely. For instance, some keypads may be laid out such that the use of an '8' key to specify a direct front location and a '2' key to specify a direct back location may be more suitable than using the '2' key to specify the direct front location and the '8' key to specify the direct back location. In other words, the convention associated with assigning directions based on a keypad may vary widely. The convention associated with assigning directions based on a keypad may be such that the convention is not related to the layout of keys on the keypad. That is, keys may generally be predefined to be associated with certain directions.

Further, in lieu of assigning angles for three-dimensional spatial by entering desired angles, three-dimensional spatial directions may be assigned using other methods. Certain keys of a keypad may be predefined to be associated with certain angles without departing from the spirit or the scope of the present invention. For example, a '1' key may be defined as being associated with a forty-five degree angle such that by selecting the '1' key when appropriate, a voice or sound is assigned to be perceived by a sound receiver from a forty-five degree angle.

While a TUI has been described as being a keypad, it should be appreciated that a TUI is not limited to being a keypad. In one embodiment, a TUI may be a voice-based interface in which a sound receiver or user speaks his or her direction selections. By way of example, rather than entering a '4' key of a keypad to specify that sound is to originate to the direct left of a sound receiver, the word 'four' or the word 'left' may instead be spoken in response to a voice prompt. Similarly, in a system in which a clock face-based direction convention is used, speaking the word 'nine' or 'nine o'clock' may allow a sound to be specified as originating to the direct left of a sound receiver.

It should be appreciated that selecting or entering a key of a keypad may include pressing the key, typing the key, or otherwise engaging the key such that a value associated with the key may effectively be registered, as for example with a conference server. Similarly, entering a direction using a key may include selecting a key of a keypad.

Generally, a sound receiver may assign spatial audio directions such that each voice on a conference call is assigned to a different spatial audio direction. In some instances, a sound receiver may be substantially simultaneously associated with a plurality of different conferences calls. If the sound receiver is associated with more than one conference call, the sound receiver may assign each conference call to a different spatial audio direction, e.g., all voices associated with a first conference call have the one spatial audio direction and all voices associated with a second conference call have another spatial audio direction.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
providing sound to a user, the sound originating at a sound source associated with a conference call, wherein the user is a participant in the conference call;
receiving through a telephony user interface from the user at the telephony user interface an indication of a first direction of the sound source along a first axis with respect to the user and a second direction of the sound source along a second axis with respect to the user, the first axis being substantially perpendicular to the second axis, wherein receiving through the telephony user interface from the user at the telephony user interface further includes obtaining a distance perception indication; and
communicating the indication of the first direction and the second direction as well as the distance perception indication to enable audio communication of sound originating at the sound source to the user as if coming from the first direction and the second direction, and as if having a distance associated with the distance perception indication, with respect to the user;
providing a perception that the sound is coming from the first direction, the second direction, and the distance with respect to the user; and
changing the perception, wherein changing the perception includes modifying a latency associated with the perception.

2. The method of claim 1 wherein the telephony user interface is a telephone keypad, and receiving through the telephone keypad from the user at the telephone keypad the indication of the first direction of the sound source along the first axis with respect to the user comprises sensing an entry provided using at least one key of a plurality of keys in the telephone keypad, wherein the at least one key is indicative of the first direction.

3. The method of claim 2 wherein the sound is to be received from the sound source by the user, and the plurality of keys comprises a first key arranged to indicate the first direction as being in front of the user, a second key arranged to indicate a the first direction.

4. The method of claim 1 wherein communicating the indication of the first direction and the second direction to enable the audio communication of sound originating at the sound source to the user as if coming from the first direction and the second direction with respect to the user comprises communicating the indication to an audio mixer of a conference server.

5. The method of claim 1 wherein the distance perception indication indicates a gain level associated with the sound source.

6. The method of claim 1 wherein the indication is a first indication and the sound source associated with the conference call is a first sound source associated with the conference call, the method further including:
receiving through the telephony user interface from the user at the telephony user interface a second indication of a first direction of a second sound source associated with the conference call along the first axis with respect to the user and a second direction of the second sound source along the second axis with respect to the user; and
communicating the second indication of the first direction of the second sound source and the second direction of the second sound source to enable audio communication of sound originating at the second sound source to the user as if coming from the first direction and the second direction with respect to the user.

7. An apparatus comprising:
a telephony user interface operable to receive from a user at the telephony user interface an indication of a first direction of a sound source associated with a conference call along a first axis with respect to the user and a second direction of the sound source along a second axis with respect to the user, the telephony user interface further being operable to obtain a distance perception indication, the first axis being substantially perpendicular to the second axis, the telephony user interface including a keypad arrangement; and
an interface operable to communicate the indication of the first direction and the second direction as well as the distance perception indication to enable audio communication of sound originating at the sound source to the user as if coming from the first direction and the second direction, and as if having a distance associated with the distance perception indication, with respect to the user, wherein the distance associated with the distance perception indication accounts for a latency associated with the sound originating at the sound source;
the interface operable to provide a perception that the sound is coming from the first direction, the second direction, and the distance with respect to the user and change the perception, wherein changing the perception includes modifying a latency associated with the perception.

8. The apparatus of claim 7 wherein the telephony user interface is a telephone keypad, and the telephone keypad is further operable to sense an entry provided using at least one key of a plurality of keys in the telephone keypad, wherein the at least one key is indicative of the first direction.

9. The apparatus of claim 8 wherein the sound is to be received from the sound source by the user, and the plurality of keys comprises a first key arranged to indicate the first direction as being in front of the user, a second key arranged to indicate a the first direction as being in back of the user, a third key arranged to indicate the first direction as being to a left of the user, and a fourth key arranged to indicate the first direction as being to a right of the user.

10. The apparatus of claim 7 further comprising an arrangement operable to provide a perception that the sound is coming from the first direction and the second direction with respect to the user.

11. The apparatus of claim 7 wherein the second direction is specified as an angle, the angle being specified relative to the first axis.

12. The apparatus of claim 7 wherein the indication further comprises a third direction of the sound source.

13. The apparatus of claim 7 wherein the indication is a first indication and the sound source is a first sound source associated with the conference call, the telephony user interface is further operable to receive from the user a second indication of a first direction of a second sound source associated with the conference call along the first axis with respect to the user and a second direction of the second sound source along the second axis with respect to the user, and the interface is further operable to communicate the second indication of the first direction of the second sound source and the second direction of the second sound source to enable audio communication of sound originating at the second sound source to the user as if coming from the first direction and the second direction with respect to the user.

14. Logic encoded in one or more tangible non-transitory computer-readable media for execution and when executed operable to:
- provide sound to a user, the sound originating at a sound source associated with a conference call, wherein the user is a participant in the conference call;
- receive through a telephony user interface from the user at the telephony user interface an indication of a first direction of the sound source along a first axis with respect to the user and a second direction of the sound source along a second axis with respect to the user, the first axis being substantially perpendicular to the second axis, wherein the logic operable to receive through the telephony user interface from the user at the telephony user interface is further operable to obtain a distance perception indication; and
- communicate the indication of the first direction and the second direction as well as the distance perception indication to enable audio communication of sound originating at the sound source to the user as if coming from the first direction and the second direction, and as if having a distance associated with the distance perception indication, with respect to the user;
- provide a perception that the sound is coming from the first direction, the second direction, and the distance with respect to the user; and
- change the perception, wherein changing the perception includes modifying a latency associated with the perception.

15. The logic of claim 14 wherein the telephony user interface is a telephone keypad, and the logic is further operable to sense an entry provided using at least one key of a plurality of keys in the telephone keypad, wherein the at least one key is indicative of the first direction.

16. The logic of claim 15 wherein the sound is to be received from the sound source by the user, and the plurality of keys comprises a first key arranged to indicate the first direction as being in front of the user, a second key arranged to indicate a the first direction as being in back of the user, a third key arranged to indicate the first direction as being to a left of the user, and a fourth key arranged to indicate the first direction as being to a right of the user.

17. The logic of claim 14 wherein the logic is further operable to provide a perception that the sound is coming from the first direction and the second direction with respect to the user.

18. The logic of claim 14 wherein the second direction is specified as an angle, the angle being specified relative to the first axis.

19. The logic of claim 14 wherein the indication further comprises a third direction of the sound source.

20. The logic of claim 14 wherein the indication is a first indication and the sound source is a first sound source associated with the conference call, and wherein the logic is further operable to:
- receive through the telephony user interface from the user at the telephony user interface a second indication of a first direction of a second sound source associated with the conference call along the first axis with respect to the user and a second direction of the second sound source along the second axis with respect to the user; and
- communicate the second indication of the first direction of the second sound source and the second direction of the second sound source to enable audio communication of sound originating at the second sound source to the user as if coming from the first direction and the second direction with respect to the user.

\* \* \* \* \*